(No Model.)

J. B. CLEMENT.
Vehicle Wheel.

No. 238,853.      Patented March 15, 1881.

Attest:
Courtney A. Cooper
F. O. W. Cleary

J. B. Clement
By his attorney
Charles E. Foster

UNITED STATES PATENT OFFICE.

JOHN B. CLEMENT, OF MORROW, OHIO.

VEHICLE-WHEEL.

SPECIFICATION forming part of Letters Patent No. 238,853, dated March 15, 1881.

Application filed January 4, 1881. (No model.)

*To all whom it may concern:*

Be it known that I, JOHN B. CLEMENT, of Morrow, Warren county, Ohio, have invented certain Improvements in Wheels, of which the following is the specification.

My invention relates to that class of wheels for carriages and other vehicles in which the inner ends of the spokes are clamped between metallic rings or flanges, the objects of my invention being to secure a firmer attachment of the spokes to the hub, to avoid weakening the spokes, and facilitate the manufacture of the wheel.

Figure 1:
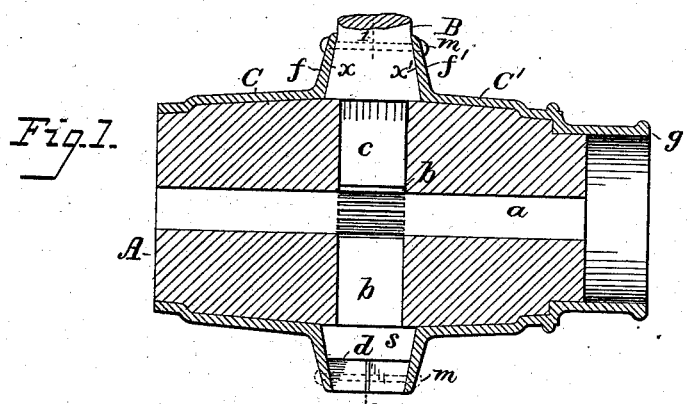
Figure 2:
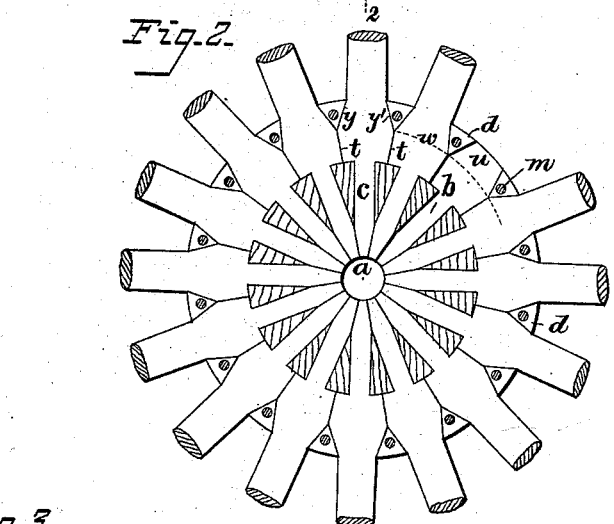
Figure 3:
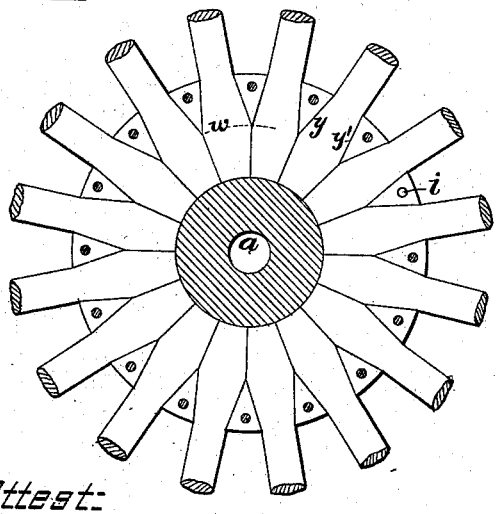
Figure 4:
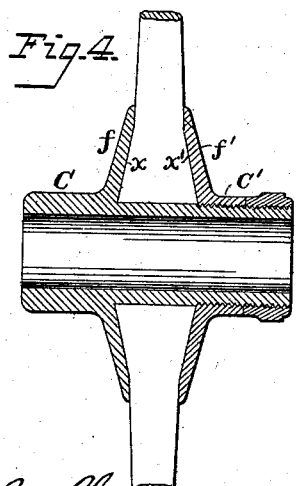

In the drawings, Figure 1 is a longitudinal section of sufficient of a carriage-wheel to illustrate my invention. Fig. 2 is a section on the line 1 2, Fig. 1; Fig. 3, a modification. Fig. 4 is a view illustrating the invention in connection with a metallic hub.

The hub A may be wholly of wood, as shown in Figs. 1, 2, and 3, or wholly of metal, as in Fig. 4; or it may consist in part of wood and in part of metal, as in many hubs now made. When the hub is made of wood it is pierced longitudinally, forming an opening, $a$, to receive the box, and radially to form a series of diverging sockets, $b$, to receive the tenons $c$ at the ends of the spokes B. Each tenon is smaller in width and thickness than the end of the spoke from which it projects, this end being enlarged in both directions to form double dovetails. Thus the front and rear sides of the spoke are beveled to form the diverging faces $x\,x'$, Fig. 1, and the adjacent sides are likewise beveled to form diverging faces $y\,y'$, Figs. 2 and 3, at right angles to the faces $x\,x'$, and extending to the line $w$, Figs. 2 and 3, where the side of the spoke bears against the adjacent spoke, meeting the latter on a radial line, $t$.

The hub is provided with an inclined flange, $f$, which may be part of a ring, C, the inner inclined face of which coincides with the beveled faces $x$ of the spokes, and a similar ring, C', has a flange, $f'$, the inner face of which coincides with the inclined faces $x'$ of the spokes, as shown in Figs. 1 and 4. From either one or from both of the flanges $f\,f'$ extend series of angular lugs $d$, which are adapted to fit between the inclined faces $y\,y'$ of adjacent spokes, as shown in Figs. 2 and 3. Thus the flanges $f\,f'$, in connection with the spokes having diverging faces $x\,x'$, form a dovetail annular socket adapted to receive the flaring ends of the spokes, while the various lugs $d$ have between them dovetailed sockets $u$, also adapted to receive flaring portions of the spokes. Each spoke is thus held independently of the others within a dovetailed socket expanding toward the lower end, both from front to rear, and from side to side, whereby such a gripe is secured as will effectually prevent any removal of the spoke until one or other of the rings is displaced.

One ring, $f$, may be secured to the hub permanently or detachably; or it may form part of the metal hub, as shown in Fig. 4, while the other ring, C', is detachable. For instance, this ring C' may be threaded to screw upon the hub; or, as is preferable, it may be heated, applied to, and shrunk upon the hub. Any other available mode of fastening may be employed.

It will be found advantageous in some instances to prolong the sleeve portion of the ring C', so as to form an annular flange, which constitutes the hub-band $g$, thereby rendering unnecessary the application of a separate band, and securing increased strength.

One difficulty in this class of wheels has been the tendency of the clamping-rings to be forced apart under the severe strains resulting from the tilting of the spokes. Another objection has resulted from the shrinking of the spokes so that water could penetrate between the same and the faces of the rings. To overcome these defects I perforate each ring or flange, forming openings $i$, extending directly through the lugs $d$, and pass bolts or rivets $m$ through the said openings, very near the periphery of the rings, and rivet the ends, so as to clamp the flanges tightly upon the spokes. By this means without any perforation or weakening of the spokes the latter are clamped securely between the flanges, while the latter are tied together almost at their peripheries, so that they cannot be forced apart by the tilting of the spokes without rupturing the bolts.

When the metal hub is used I propose to dispense with the tenons $c$.

It will be apparent that by modifying the forms of the rings the spokes may be "staggered."

I am aware that it has been common to use lugs with spokes having beveled bearings on the meeting portions of the spokes. This I do not claim; but

I claim—

1. The combination, in a wheel, of a hub and clamping-rings constructed to form double dovetailed sockets adapted to receive the ends of spokes expanded from front to rear and from side to side, substantially as set forth.

2. The combination, in a wheel, of a hub, A, clamping flanges or rings C C', and spokes having diverging faces $y$ $y'$ $x$ $x'$, fitting between the rings and between lugs $d$ thereof, substantially as set forth.

In testimony whereof I have signed my name to this specification in the presence of two subscribing witnesses.

JOHN B. CLEMENT.

Witnesses:
F. M. GREEN,
CHARLES E. FOSTER.